United States Patent [19]
Baird, Jr.

[11] Patent Number: 4,832,834
[45] Date of Patent: May 23, 1989

[54] ELASTOMER SIEVE SCREEN

[76] Inventor: Howard R. Baird, Jr., Box 42, West Pittston, Pa. 18643

[21] Appl. No.: 217,773

[22] Filed: Jul. 11, 1988

[51] Int. Cl.⁴ .............................................. B07B 1/46
[52] U.S. Cl. ..................................... 209/397; 29/160; 29/163.8; 83/51; 209/379; 209/931
[58] Field of Search ............... 29/160, 163.8; 409/131, 409/132; 83/51, 878, 397; 209/397, 379, 392, 931

[56] References Cited

U.S. PATENT DOCUMENTS

| | | | |
|---|---|---|---|
| 2,419,155 | 4/1947 | Orton, Jr. | 209/397 |
| 3,943,054 | 3/1976 | Simonson | 209/397 X |
| 4,473,466 | 9/1984 | Schmidt et al. | 209/397 |
| 4,563,270 | 1/1986 | Wolff | 209/379 |

FOREIGN PATENT DOCUMENTS 529270 10/1930 Fed. Rep. of Germany ...... 209/397

Primary Examiner—Steven C. Bishop

[57] ABSTRACT

A process of manufacture of a lattice configurated elastomer screen for classification, screening and washed of fragmented hard stocks of material. The process of manufacture of this lattice screen employs a cutting device with at least one rotary cutting blade. for extracting mutually spaced slots in the top and bottom layers of an elastomer sheet; with the top slots lying essentially above the bottom slots; being disposed transversely of one another. The top and bottom slots are cut at a common, intersecting depth of one another in the elastomer sheet: joining the bottom slots with the top slots; forming preferably rectangular apertures between the top and bottom slots areas of this lattice designed sifting body.

2 Claims, 2 Drawing Sheets

ELASTOMER SIEVE SCREEN

BACKGROUND OF THE INVENTION

1. Field of the Invention

The invention relates to a method of manufacture of a lattice designed elastomer screen body.

2. Description of the Prior Art

Elastomer screen bodies are well known. They are employed on shaker screen boxes for classification, cleaning, and dewatering of fragmented stocks of hard material such as stone, coal, aggregate, sand, and the like. Elastomer screens are substituted for the conventional metal screen bodies such as wire and punch plate screens. When properly applied, these elastomer screen bodies outlast the said metal screen bodies in wear life by five to ten times.

The said metal type screens create din and noise from the charging of such screens, by the bouncing and tumbling of hard material when employed in shaker boxes for classification of fragmented hard stock material. This has been a source of noise pollution in and around the work place, which is alleviated by the substitution of an elastomer screen body such as, a polyurethane or a rubber material screen body, for the said metal type screen. These elastomer screens absorb the charging shock forces of the said hard material being sifted, eliminating much of the noise factors created by said usage of metal type screen bodies.

Some of the benefits of elastomer screen bodies are readily seen above. Yet, the process of manufacture of the prior art elastomer screen bodies involve complicated molding processes, further complicated by the requirement of the manufacture to make and have available sieves or screens having mesh sizes, sometimes square, sometimes round, sometimes elongate, in as many as a hundred sizes. The original or investment costs of such molds and processing is extremely high. Some prior structures have employed laminations of elastomer sheets vulcanized to metal sheets of large size properly punched or apertured for the sizing required. The method of punching or perforating to attain an aperture size in said elastomer sheets requires a multitude of custom made punches, custom made tools, and custom made machinery, which the original investment costs for a manufacture is extremely high. These disadvantages of the prior art are overcome by the present invention.

SUMMARY OF THE INVENTION

The present invention relates to a method of manufacture of an elastomer screen body. It is an object of my invention to provide a simple process of manufacture of a lattice configurated screen body of (but not limited to) polyurethane, or polyethylene. These elastomers are easily and quickly slot cut into a lattice configurated screen body by the process of my invention which comprises essentially, in the preferred form, the employment of at least one rotary cutting blade such as, (but not limited to) a router bit, or a circular saw blade of a desired or predetermined size, shape, and configuration, guided and propelled at the necessary revolutions per minute, using even the simplest means (but not limited to) a router table, or a circular saw table, or a jig or the like with the necessary motor device and attachments needed for the proper employment of the repeated use of the said cutting blade or blades at an appropriate predetermined depth in a large or necessary size sheet of elastomer material body for creating or extracting two separate series of mutually parallel spaced slot areas: one being in the top or charging area layer, and the second in the parallel rear or bottom area layer of a singular said sheet. The said top and bottom slots are transversely disposed of one another, and also intersect, forming the desired integral, discrete, preferably rectangular four sided apertures in the said sheet of elastomer material, creating a lattice configurated elastomer screen body, by the said simple method of manufacture of employing relatively inexpensive tools, cutting blades, and the necessary machinery or devises available at most hardware and industrial stores at a fraction of the original investment costs occurred in the start up and manufacturing of the prior art custom made molds, custom made punches, and custom made machinery needed for the making or creating the prior art elastomer screen structures.

The said elastomer screen body inherent lattice design along with its flexible elastic make-up obviates clogging, while increasing the life of the said lattice screen body by its top longitudinal elastomer bar areas protecting the lower transverse elastomer bar areas from the charging of large fragmented hard stock material being sifted on a shaker box unit, consequently increasing the life usage of the preferably rectangular apertures of the said screen. This said screen elastic make-up flexes and bounces when sifting hard stock material on a shaker box unit, keeping its integral, discrete, said four sided apertures free from near size plugging of fragmented hard stock material being separated, increasing the productivity of said screen when in use.

The various aspects of the present invention will be more fully understood when the following portions of the specification are read in conjunction with the accompanying drawings wherein:

DETAILED DESCRIPTION OF THE PREFERRED METHOD AND EMBODIMENT

Figure 1:
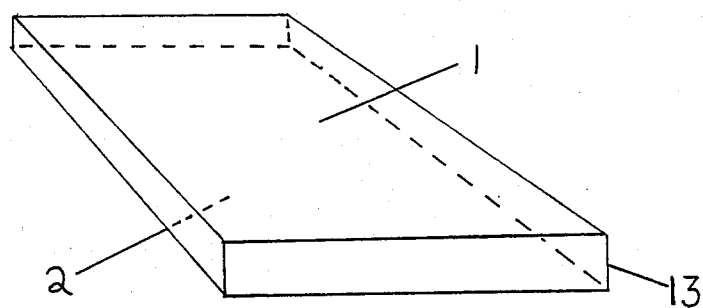
FIG. 1 is a sheet of elastomer material to be formed into a lattice design sifting body by the process of the invention, showing a side elevation, a top and bottom material layer.
Figure 2:
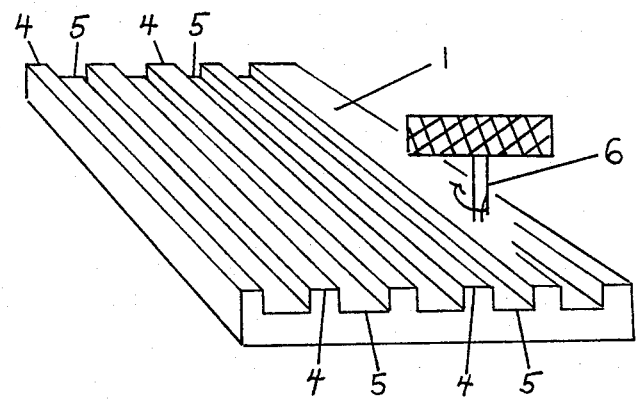
FIG. 2 is the method employed by this invention, showing a guided rotary cutting blade rotating by its means, extracting mutually parallel spaced slots in the top layer of the sheet of elastomer material shown in FIG. 1, along with showing a side elevation, and an end elevation.
Figure 3:
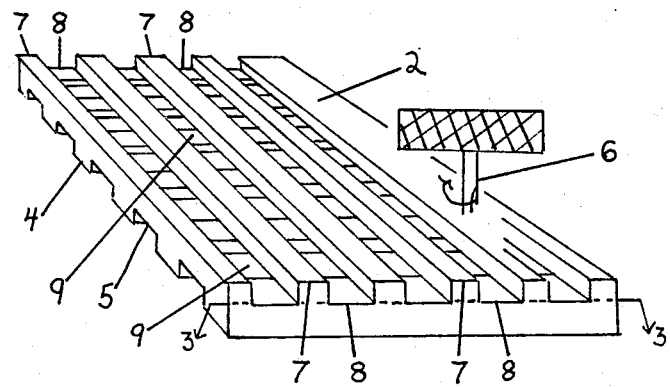
FIG. 3 is the method employed in this invention, showing a guided rotary cutting blade rotating by its means, extracting the second series of mutually parallel spaced slots in the bottom layer of the sheet of elastomer material shown in FIG. 2, further the bottom said slot areas traverse the upper or top layer slot areas, and intersect on line 3—3 in FIG. 3, forming the shown rectangular four sided apertures, further shown are the side and end elevations.

Referring now to the drawings in detail, FIGS. 1 to 3 illustrate the sequence of steps involved in the preferred method of manufacture, of a lattice configurated elastomer screen body. FIG. 1 is a sheet of elastomer material identified as an entirety by the letter E, further showing a side and an end elevation of a vertical thickness 13, and a top layer 1 with a bottom layer numbered 2. The said thickness is predetermined per application of a desired screen body, based on the top size fragmented hard stock material that will charge the said screen to be manufactured, along with the desired fragmented material to be sifted in a shaker box unit. The said thickness on the average is three quarters the width of the desired preferred rectangular aperture to be formed by the invention.

FIGS. 2 and 3 respectively show the said sheet of elastomer material being slot cut easily and quickly, by the process of my invention which comprises essentially in the preferred form, the employment of at least one rotary cutting blade at an appropriate predetermined vertical depth in a desired large or necessary sized singular said elastomer sheet E, for creating or extracting two separate series of mutually parallel predetermined spaced slot areas: one being in the top layer 1 of the said sheet as shown in FIG. 2 numbered 5, and the second being in the parallel rear or bottom layer 2 of said sheet as shown in FIG. 3 numbered 8. The said top slot areas 5 and the said bottom slot areas 8 are preferably located orthogonal of each other, and intersect at a predetermined common vertical depth as shown on line 3—3 in FIG. 3, forming the desired integral, discrete, predetermined, preferably rectangular, four sided apertures identified by the number 9 by and at the intersections of the said top and bottom slot areas, further the said apertures are defined and set apart by the elastomer rib bar areas 4 and 7 of a predetermined elevation as shown in FIGS. 2 and 3 respectively.

Figure 4:
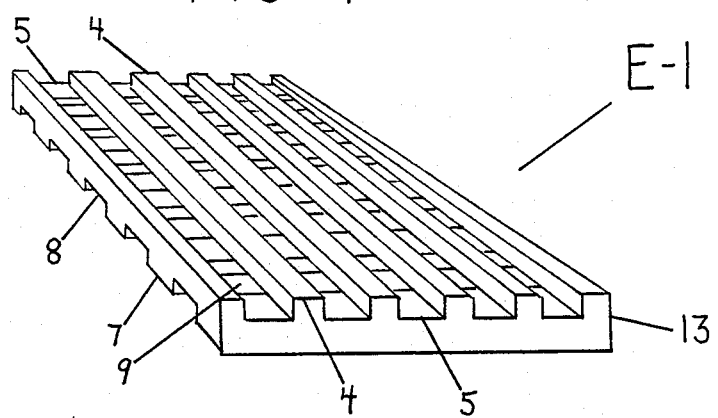
FIG. 4 is a fragmentary top or charging area plan view with the side elevation, and end elevation, illustrative of the lattice configurated screen body formed from this process of this invention; showing on a large scale, a portion of a classifying screen for aggregate or other fragmented hard stock materials; the view is foreshortened, but shows a multiplicity of the rectangular four sided apertures formed by the process of this invention.

FIG. 4 is a fragmentary top or charging area plan view with a side elevation, and an end elevation of a predetermined vertical thickness 13, illustrative of the lattice configured elastomer screen body formed from the invention labeled as an entirety E-1; showing on a large scale, a portion of a classifying said screen body for aggregate or other fragmented hard stock materials; the view is foreshortened, but shows a multiplicity of the four sided apertures 9 formed by the said process of the invention. The said screen body is of a predetermined length and width per desired application. Further the longitudinal length of the slotted areas are in the drawings shown as running side to side and end to end respectively, but their respective longitudinal length is predetermined per desired application on required open area of the desired screen body to be produced by the invention.

While in the drawings, the proportions of the said four sided apertures are square, it is to be understood that by varying the width of the said slot areas proportions, various elongated or slit-openings may be achieved for screens designed for classifying slivery or elongated particle stock. Further, the said elastomer rib bar areas, 4 and 7, are rectangular in the drawings; they may be formed in other designs such as (but not limited to) rounded or just tapered at a desired angle by the simple employment of the proper design of the said rotary cutting blade such as (but not limited to) a curved or a triangular shaped router bit; further said cutting blades such as the circular saw blades available at inexpensive investment costs at most hardware and industrial stores, may be ganged properly together to make various desired size or width said slot areas 5 and 8; also, the employment of one or more said cutting blades properly spaced and guided by an appropriate jig may be utilized for creating one or more said slot areas simultaneously by said invention.

Figure 5:
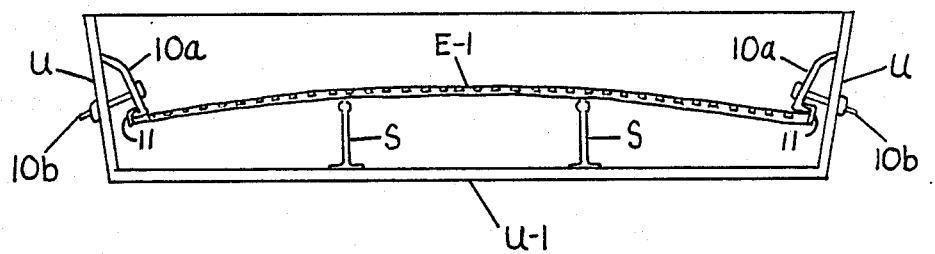
FIG. 5 is a diagrammatic cross section, showing an embodiment formed from the process of this invention, applied to a conventional shaker box, and provided with tensioning means for a sieve body on a reduced scale.

As shown in FIG. 5, the said lattice configurated elastomer screen body E-1 may be operatively secured in a conventional shaker box by an appropriate predetermined means such as, (but not limited to) by affixing metal formed hooks 11 by a proper means such as bolting or otherwise to and for the longitudinal length of two opposite parallel lateral edges of the screen body, which are adjacent to the lower ends of the tensioning arms 10a, said arms pivoted at their upper ends to the sides U of the box, may be forcibly swung outwardly by nutted tensioning bolts 10b.

Longitudinal "bumper" bars S secured in parallel widely spaced relation may also be used to further elevate and tension the screen. As shown, bars S are affixed to the bottom U-1 of the shaker box.

It will also be understood that a relatively wide choice of elastomer materials may be employed, including those designated herein, polyurethanes, polyethylenes, and many polymers.

It will of course be further understood that a relatively wide choice of rotary cutting blades may be employed, including those designated herein, router bits, and circular saw blades, and many rotary cutting blades of various desired size, shape, and configuration.

The size, thickness, and shape of the sheet of elastomer material is employed in the claims to designate that such dimensions are predetermined per application such as, if the desired screen to be manufactured by said process of the invention is four feet by four feet, half an inch thick, and then said sheet is of the same dimensions. Said thickness on the average is three quarters of the width of the preferably rectangular four sided apertures to be produced by the process of the invention. The said screen is also preferably rectangular.

The distance between the said slot areas is an elastomer bar width, which is predetermined per application of the said screen body. An average elastomer bar width is one half the thickness of the screen to be produced by said process of the invention.

The cutting means is employed in the claims to designate the various cutting means that may be employed such as, those designated herein, router, circular saw, and many other cutting means.

The depth of the said slots are predetermine per application of the screen to be produced by the process of the invention. An average of the said slot depth is one half the thickness of the screen to be manufactured by the process of the invention.

The new and improved results attained by my invention may be briefly pointed out as follows:

1. The original investment costs incurred in the start up and manufacturing of the lattice design sifting body produced by the process of this invention is appreciably reduced in contrast to any prior art method of manufacture of elastomer screens known to applicant for use with vibratory sieve boxes.

2. The quick and easy formation of intersecting, transverse, mutually parallel spaced slotted areas of the top and bottom layers of a singular elastomer sheet by the process of this invention herein, permits very economical production of an elastomer screen body that can be adapted to a shaker box unit for classification and separation of fragmented hard stock material.

3. The elastomer screen body inherent lattice design along with its flexible elastic make-up obviates clogging, while increasing the life of the rectangular apertures by the upper longitudinal elastomer bar areas protecting the lower elastomer bar areas defining the said apertures.

4. The invention gives way to a quick method of creating a screen out of the very economical polyethylene sheets of material, which are very abrasive resistant, and when slot cut by the process of this invention form a lattice design elastomer screen, said screen flexes, and fits over a crowned vibratory sieve deck.

5. Capital and installation costs for production of a great number of different size rectangular apertures of an elastomer screen is substantially reduced.

6. Noise as a pollutant is greatly minimized by this lattice designed elastomer screen body, while screening hard fragmented material in a vibratory box unit.

7. A great variety of elastomer bar shapes may be formed by the invention, by the employment of a desired economical rotary cutting blade of a predetermined size, shape, and configuration.

What is claimed:

1. A sieve screen comprising: a flat, plate-like, flexible member having a certain thickness, mutually perpendicular slots formed in opposite surfaces of said member, the slots in each said surface being spaced parallel to the slots on the same surface, the slots in each said surface intersecting transversely with the slots on the opposite surface forming rectangular apertures of a certain size, each of said apertures having four corners and a corner thickness, said corner thickness being equal to said certain thickness, whereby said apertures resist clogging of particles nearly equal in size to said certain size.

2. The sieve screen as set forth in claim 1, wherein the flat member is comprised of elastomer material.

* * * * *